United States Patent [19]
Miller

[11] 3,909,042
[45] Sept. 30, 1975

[54] MOVABLE CARRYING STRUCTURE

[76] Inventor: Clyde A. Miller, 3327 Comanche Pl., Owensboro, Ky. 42301

[22] Filed: Dec. 21, 1973

[21] Appl. No.: 427,136

[52] U.S. Cl. .................... 280/204; 280/493
[51] Int. Cl. .......................... B62k 27/12
[58] Field of Search ............ 280/204, 493, 496

[56] References Cited
UNITED STATES PATENTS

| | | | |
|---|---|---|---|
| 624,678 | 5/1899 | Planes | 280/204 |
| 730,193 | 6/1903 | Parker | 280/204 |
| 2,254,797 | 9/1941 | Dobay | 280/204 |
| 2,283,716 | 5/1942 | Zalimeni | 280/204 |
| 3,271,048 | 9/1966 | Beesley | 280/204 |
| 3,734,536 | 5/1973 | Dever | 280/204 |
| 3,787,065 | 1/1974 | Grimm | 280/204 |

FOREIGN PATENTS OR APPLICATIONS

| | | | |
|---|---|---|---|
| 22,157 | 10/1902 | United Kingdom | 280/204 |
| 834,947 | 12/1938 | France | 280/204 |

Primary Examiner—David Schonberg
Assistant Examiner—Terrance L. Siemens
Attorney, Agent, or Firm—Warren D. Flackbert

[57] ABSTRACT

A movable carrying structure having particular adaptability for use with a vehicle, such as a bicycle, for example, defined by a wheeled-carried unit connected by swivel means to the aforesaid bicycle so that in the event the bicycle overturns, the carrying structure remains in a normal or upright position.

4 Claims, 4 Drawing Figures

MOVABLE CARRYING STRUCTURE

The invention provides a movable structure which, as presently known, has not been marketed or comparable to any units in use heretofore. In this connection, the movable carrying structure of the invention has particular adaptability for use in conjunction with a bicycle, or other like vehicles, being secured through an element which connects, as desired, to one portion of the bicycle framework and at its opposite end, through a sleeve-swivel arrangement, to a portion of the framework of the carrying structure. The element, in a preferred embodiment, comprises two sections, one being adjustable with respect to another in a telescopic arrangement.

Briefly, the carrying structure is supported by two wheels, typically of the pneumatic type, and includes, in the instance for use in the carrying of small children, for example, a removable seat, with associated safety belt means. The overall outward configuration of the carrying structure may be varied, including any desired from of upper edging, the use of reflectors for purposes of safety, and either a vertical back or a back which is tilted rearwardly.

Aside from the aforesaid transporting of children, upon movement of the bicycle, and either with or without the removal of the seat, other items may be effectively carried to serve different end purposes. Accordingly, and in view of the preceding, a better understanding of the present invention will become more apparent from the following description, taken in conjunction with the accompanying drawings, where, FIG. 1 is a top plan view showing a movable carrying structure in accordance with the teachings of the present invention;

Figure 1:
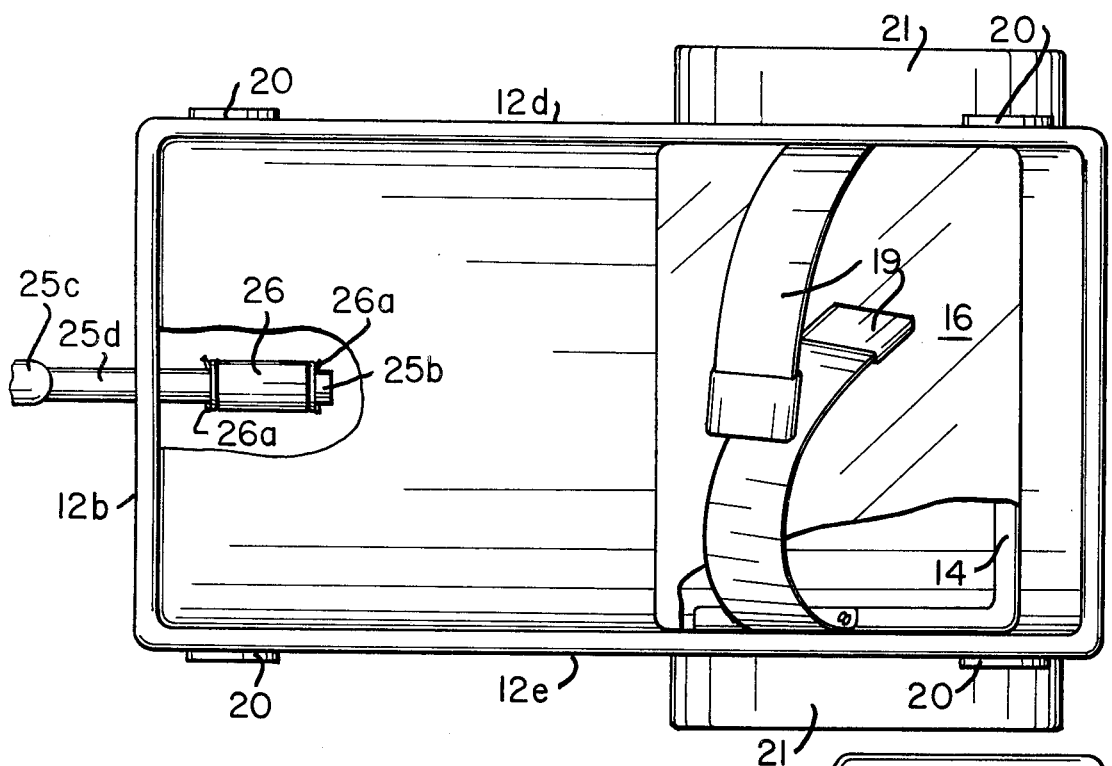

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the movable carrying structure comprising the invention is defined by a framework 12 having a bottom wall 12a, a front wall 12b, a rear or back wall 12c, and side walls 12d and 12e. The side walls 12d and 12e preferably assume the configuration shown in FIGS. 2 and 4, such being adapted for ease in an individuals ingress and egress from the unit. For reasons of safety and appearance, the upper edges of all walls may be rounded, rimmed by a plastic or resilient material, or the like.

In any event, an angle 14, or another form of support, is typically secured to a portion of the inner surfaces of the side walls 12d and 12e and to the inner surface of the rear wall 12c, serving to position a seat 16, such as a cushion, the seat 16 being removable, if so desired. As an added safety feature, a belt arrangement 19 is provided for the passengers, being secured to the angle 14; reflectors 20 disposed on the outer surfaces of the side walls 12d and 12e and back wall 12c; and, fenders 21 overlying the wheels for the unit.

Figure 3:
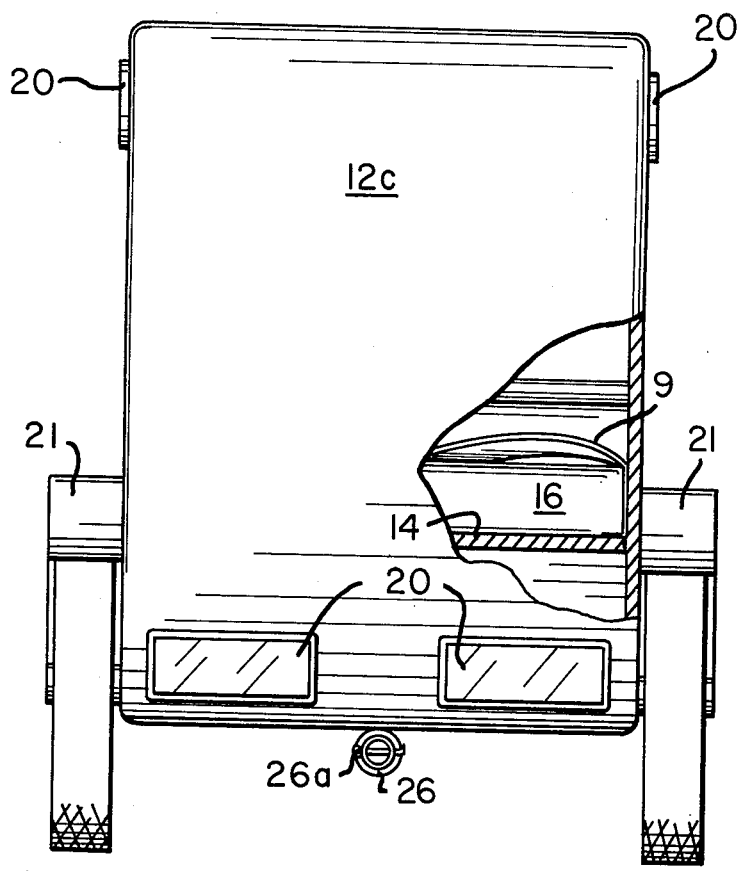
FIG. 3 is a view in rear elevation of the invention, also partly fragmentary and also in vertical section, showing further details thereof; and, FIG. 4 is a side elevational view of the instant carrying structure in relationship to use with a conventional bicycle.
Figure 4:
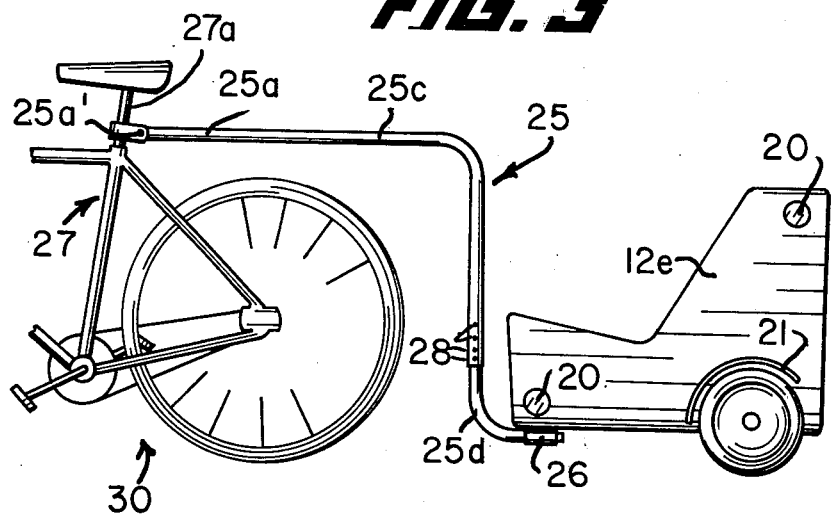

An element 25 has one end 25a secured, as by a pivot pin 25a', to a portion 27a of the framework 27 of a bicycle 30 (see FIG. 4). The element 25, typically, extends rearwardly, downwardly, and again rearwardly, to the undersurface of the bottom wall 12a of the carrying structure. The opposite end 25b of element 25 is rotatably received in a sleeve or collar 26, secured, for example, by welding, to the aforesaid undersurface, where pins or like means 26a position such opposite end 25b of the element 25 during use (see FIGS. 1, 2 and 3).

Figure 2:
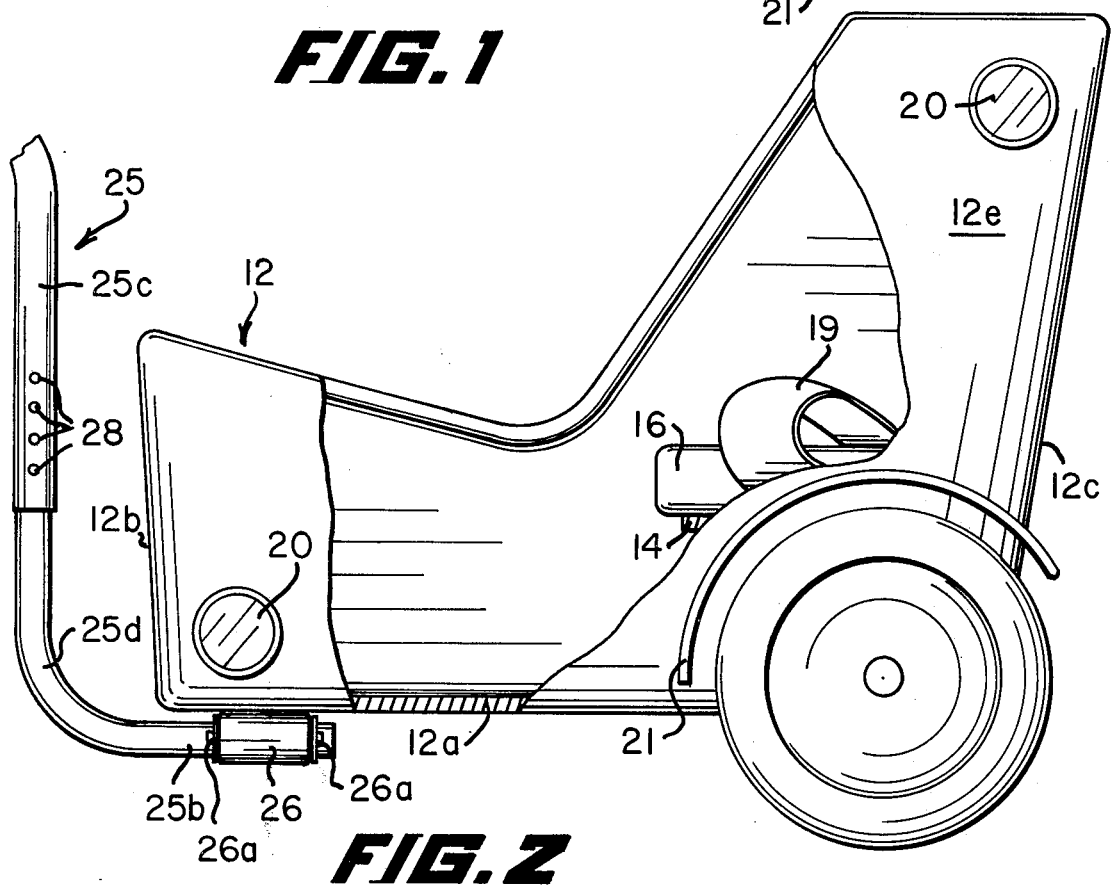
FIG. 2 is a view in side elevation, partly fragmentary and partly in vertical section, looking from the bottom to the top of FIG. 1.

The element 25 may be unitary (not shown) or may be defined by two parts 25c and 25d, as shown in FIGS. 2 and 4, illustrating a telescopic arrangement. In other words, through the selective use of a pin (not shown), extending through a series of complementary openings 28 in portion 25c of element 25 and in portion 25d (not shown) of element 25, vertical adjustment is achievable to accommodate any difference in height of the vehicle which is towing the carrying structure.

Accordingly, from the preceding, it should be apparent that the invention provides a new and useful approach for safely transporting children behind a bicycle, in contrast to a fixed side-cart, a basket, and an additional seat, or even on the handlebars. An important feature presented by the invention is the fact that if the bicycle overturns, and by reason of the rotation or swiveling of the element 25 in the fixed sleeve 26, the carrying structure does not overturn, meaning that the passenger of such, or any other contents, remain undisturbed, with total safety.

The above description, is susceptible to various changes within the spirit of the invention, as, for example, proportioning, aesthetics, the specific type of swivel or mounting arrangement, or the like. Thus, the preceding should be considered illustrative and not as limiting the scope of the following claims:

I claim:

1. A carrying structure comprising, in combination, a vehicle having a framework and a wheel-mounted carrier, where an element extends between said vehicle and said carrier, one end of which pivotally secures to said framework of said vehicle and defines a vertical axis of movement of said vehicle and the other end of which rotatably mounts on said carrier and defines a lateral axis of movement of said vehicle with respect to said carrier.

2. The carrying structure of claim 1 where said element is sectionalized, one section pivotally secured to said vehicle, and another section rotatably mounted on said carrier, said one section and said another section arranged in adjustable relationship with respect to each other, and means selectively securing said one section to said another section.

3. The carrying structure of claim 2 where said one section and said another section are in a telescopic relationship.

4. The carrying structure of claim 1 where said other end of said element is rotatable within a sleeve secured to said carrier and positioned within said sleeve by means preventing axial displacement.

* * * * *